United States Patent [19]

Penco et al.

[11] Patent Number: 5,254,626
[45] Date of Patent: Oct. 19, 1993

[54] HIGH-TENACITY, HIGH-IMPACT-STRENGTH THERMOPLASTIC COMPOSITIONS

[75] Inventors: Maurizio Penco, Codogno; Maria A. Pastorino, Genoa; Giorgio Giannotta, Milan, all of Italy

[73] Assignee: Istituto Guido Donegani S.p.A., Novara, Italy

[21] Appl. No.: 912,985

[22] Filed: Jul. 14, 1992

[30] Foreign Application Priority Data

Aug. 2, 1991 [IT] Italy .................. MI91A 002157

[51] Int. Cl.$^5$ ........................... C08H 67/02
[52] U.S. Cl. .......................... 525/166; 525/173; 525/176; 524/369
[58] Field of Search .............. 525/166, 173, 176; 524/369

[56] References Cited

U.S. PATENT DOCUMENTS 4,753,980 6/1988 Deyrup ................ 524/369

FOREIGN PATENT DOCUMENTS 0400890 12/1990 European Pat. Off.
2617176 12/1988 France.

WO 89/09243 10/1989 PCT Int'l Appl.

*Primary Examiner*—James J. Seidleck
*Assistant Examiner*—I. Zemel
*Attorney, Agent, or Firm*—Oblon, Spivak, McClelland, Maier & Neustadt

[57] ABSTRACT

Thermoplastic compositions comprising:

(a) from 55 to 85% by weight of at least one aromatic polyester;

(b) from 10 to 40% by weight of at least one elastomeric copolymer constituted by 45-90 mol % of ethylene, 5-50 mol % of an alkyl acrylate or alkyl methacrylate, in which the alkyl moiety contains from 1 to 8 carbon atoms, 0.3-5 mol % of an unsaturated epoxide;

(c) from 0.5 to 5% by weight of at least one elastomeric copolymer constituted by 45-90 mol % of ethylene, 5-50 mol % of an alkyl acrylate or alkyl methacrylate, in which the alkyl moiety contains from 1 to 8 carbon atoms, 0.1-5 mol % of monomeric units functionalized with amido-aminic and/or imido-aminic moieties;

with the total of the percentages of components (a), (b) and (c) equating 100.

11 Claims, No Drawings

HIGH-TENACITY, HIGH-IMPACT-STRENGTH THERMOPLASTIC COMPOSITIONS

The present invention relates to thermoplastic compositions based on aromatic polyesters blended with functionalized elastomers, which compositions are endowed with high tenacity and impact strength characteristics.

The development of polymeric compositions based on aromatic polyesters, and, in particular, based on poly-(ethylene terephthalate) (PET), endowed with high tenacity and impact strength characteristics, is of considerable importance, because it enables recycled products of industrial type (scraps) and civil type (packages) to be used in the production of materials suitable for applications of semi-structural type, e.g., in automobile and household electrical appliances sectors.

It is well-known that the thermoplastic polyesters, such as poly-(ethylene terephthalate) (PET), and poly-(butylene terephthalate) (PBT), are polymers which, in their pristine state, display extremely low values of impact strength.

It is known as well that the tenacity values of materials based on thermoplastic polyesters can be increased by suitably mixing said thermoplastic polyesters with a wide range of elastomers. Used for that purpose are, e.g., elastomeric systems based on ethylene copolymers with alkyl acrylates or alkyl methacrylates, functionalized with acid anhydride moieties (JP patent application 62-167 531) or epoxy groups (patent applications EP-341 731 and WO-85/03 718).

Attempts to further improve the technological characteristics of such materials were performed by blending, in the molten state, aromatic polyesters simultaneously with two elastomeric copolymers of ethylene with alkyl acrylates or alkyl methacrylates, respectively containing epoxy and acid anhydride functionalities (see M. Hert, J. C. Jannel and P. Robert, The Sixth Annual Meeting, PPS, Apr. 17-20, 1990, Nice, France; and patent applications WO-89/05 838 and EP-342 067). Although they showed improvements in some mechanical properties, such as modulus and tensile strength, the resulting materials did not show any meaningful changes in their impact strength properties, which, in some cases, are even worse than of polyester-based blends already known from the prior art.

The present Applicant surprisingly found now that thermoplastic compositions based on aromatic polyesters can be obtained, which display high tenacity and high impact strength values, if said polyester is mixed with two different elastomeric copolymers of ethylene with alkyl acrylates or alkyl methacrylates, the first of which contains functional epoxy groups, and the second of which contains amido-amino and/or imido-iminic functional groups.

Therefore, the subject-matter of the present invention are thermoplastic compositions comprising:

(a) from 55 to 85% by weight of at least one aromatic polyester;
(b) from 10 to 40% by weight of at least one elastomeric copolymer constituted by 45-90 mol % of ethylene; 5-50 mol % of an alkyl acrylate or alkyl methacrylate, in which the alkyl moiety contains from 1 to 8 carbon atoms; and 0.3-5 mol % of an unsaturated epoxide;
(c) from 0.5 to 5% by weight of at least one elastomeric copolymer constituted by 45-90 mol % of ethylene; 5-50 mol % of an alkyl acrylate or alkyl methacrylate, in which the alkyl moiety contains from 1 to 8 carbon atoms; and 0.1-5 mol % of monomeric units functionalized with amido-aminic and/or imido-aminic groups;

with the total of the percentages of components (a), (b) and (c) equating 100.

The aromatic polyesters which make up part of the compositions according to the present invention are selected from the condensation products of saturated glycols with dicarboxy aromatic acids, and their derivatives. Among the saturated glycols, those containing from 2 to 10 carbon atoms, such as, e.g., ethylene glycol, propane-1,3-diol, butane-1,4-diol, pentane-1,5-diol, 2,2-dimethylpropane-1,3-diol, are generally preferred.

Among the dicarboxy aromatic acids, those containing from 8 to 14 carbon atoms, such as, e.g., terephthalic acid, phthalic acid, isophthalic acid, 2,6-naphthalene-dicarboxy acid, 4,4'-diphenyl-dicarboxy acid, are generally preferred.

Particularly preferred polyesters are poly-(ethylene terephthalate) (PET) and poly-(1,4-butylene terephthalate) (PBT), as well as their mixtures with each other, or the polycondensation product of terephthalic acid with a mixture of ethylene and butylene glycols. Among the above, poly-(ethylene terephthalate) is still more preferred.

The use of PET with an intrinsic viscosity comprised within the range of from 0.6 to 0.8 dl/g (as measured in chlorophenol at 25° C.) is particularly advantageous for the purposes of the present invention.

Elastomeric ethylene copolymers with alkyl acrylates or alkyl methacrylates also containing an unsaturated epoxide, used as component (b) in the compositions according to the present invention, are widely described in the prior art (see, e.g., M. Hert, J. C. Jannel and P. Robert, The Sixth Annual Meeting, PPS, Apr. 17-20, 1990, Nice, France; and J. F. Hagman, J. W. Crary, Encyclopedia of Polymer Sci. and Eng., Vol. 1, pages 325-334, 1985).

Of them, those constituted by 70-85 mol % of ethylene, 10-25 mol % of an alkyl acrylate or alkyl methacrylate in which the alkyl moiety contains from 1 to 8 carbon atoms, and 2-5 mol % of an unsaturated epoxide, are preferred.

Among the unsaturated epoxides which can make up part of such elastomeric copolymers, the following may be reminded:

aliphatic or aromatic glycidyl esters and glycidyl ethers, such as: glycidyl acrylate, glycidyl methacrylate, allyl-glycidyl-ether, vinyl-glycidyl-ether, glycidyl maleate, glycidyl itaconate, bisphenol-A-diglycidyl monoester with acrylic or methacrylic acid;

alicyclic glycidyl-esters and glycidyl-ethers, such as: 2-cyclohexene-1-glycidyl-ether, cyclohexene-4,5-diglycidyl-carboxylate, cyclohexene-4-glycidyl-carboxylate, 5-norbornene-2-methyl-2-glycidyl-carboxylate, endo-cis-bi-cyclo(2.2.1)-5-heptene-2,3-diglycidyl-dicarboxylate.

Glycidyl acrylate and glycidyl methacrylate are particularly preferred.

The elastomeric copolymers used as component (c) in the compositions according to the present invention preferably contain 70-85 mol % of ethylene; 10-28 mol % of an alkyl acrylate or alkyl methacrylate in which the alkyl moiety contains from 1 to 8 carbon atoms; and 0.5-2 mol % of monomeric units functionalized with amido-aminic and/or imido-aminic groups.

Among the alkyl acrylates or alkyl methacrylates useable as comonomers in both components (b) and (c), those in which the alkyl radical is of from 1 to 4 carbon atoms, such as: methyl methacrylate, ethyl acrylate, n-butyl acrylate, i-butyl acrylate, methyl acrylate, and so forth, are particularly preferred.

The monomeric units functionalized with amido-aminic and/or imido-aminic groups can have the following structures:

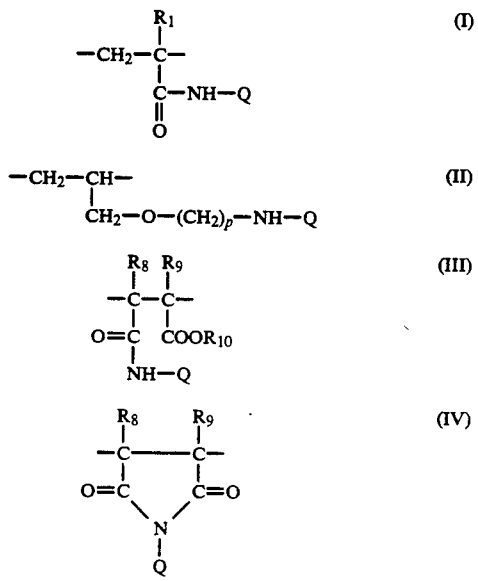

in which $R_1$, $R_8$ and $R_9$, which may be either equal to, or different from, one another, are —H or —$CH_3$;

p is an integer comprised within the range of from 1 to 6;

Q is a functional group having the structure:

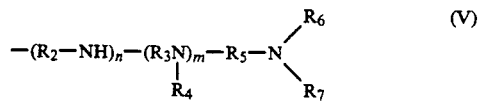

wherein:

$R_2$, $R_3$ and $R_5$, which may be either equal to, or different from, one another, are $C_1$–$C_{20}$ alkylene groups, or $C_6$–$C_{30}$ arylene groups;

$R_4$, $R_6$, $R_7$ and $R_{10}$, which may be either equal to, or different from, one another, are H or $C_1$–$C_6$ alkyl groups;

n and m, which may be either equal to, or different from, each other, are zero or integers comprised within the range of from 1 to 5.

The insertion of these functionalized monomeric units in elastomeric ethylene copolymers with alkyl acrylates or alkyl methacrylates can be accomplished according to the following methods:

(i) direct copolymerization of monomers bearing functional amido-aminic and/or imido-aminic groups with ethylene and an alkyl acrylate or alkyl methacrylate;

(ii) reaction of modification of polymeric matrices based on ethylene copolymers with alkyl acrylates or alkyl methacrylates.

Examples of functionalized monomers which can be used according to method (i) and corresponding to the monomeric structures (I)–(IV) are: amides of acrylic or methacrylic acid, or of a monoester of fumaric acid or malonic acid with polyamines; imides of polyamines with maleic anhydride. The molar ratios of ethylene, alkyl acrylate or alkyl methacrylate to the functionalized monomer are selected case-by-case, based on the reactivity of said monomers and on the compositions of the copolymer one wishes to obtain.

As regards methods (ii), the reactions of modification of polymeric matrices can be carried out either by grafting the above disclosed functionalized monomers onto the polymeric chain; or by means of the reaction of condensation with polyamines, when the starting polymer contains groups capable of reacting with the aminic groups, such as carboxy, acid anhydride or epoxy groups. In both cases, the modification reactions can be carried out in bulk, in solution, in suspension or in emulsion.

For example, elastomeric copolymers containing amido-aminic and/or imido-aminic groups can be obtained by reacting, both in solution and in the molten state, ethylene/alkyl acrylate (or alkyl methacrylate) copolymers containing reactive groups deriving from unsaturated anhydrides of dicarboxy or polycarboxy acids, with diamines of formula:

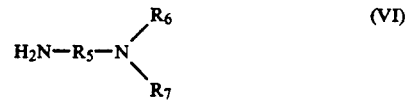

wherein $R_5$, $R_6$ and $R_7$ have the above reported meaning.

The copolymer of ethylene with alkyl acrylates or alkyl methacrylates, functionalized with acid anhydride groups can be obtained either by direct adding the unsaturated anhydride during the polymerization step, or by grafting said anhydride at a later time, onto the already formed copolymer.

For that purpose, for example the following unsaturated anhydrides can be used: maleic anhydride, itaconic anhydride, citraconic anhydride, cis-5-norbornene-endo-2,3-dicarboxy acid anhydride, cis-1,2,3,6-tetrahydrophthalic anhydride, bicyclo(2.2.2)-oct-7-ene-2,3,5,6-tetracarboxy acid anhydride, endo-bicyclo(2.2.2)-oct-5-ene-2,3-dicarboxy acid anhydride, 4-vinyl-phthalic anhydride.

Maleic anhydride is particularly preferred. In such case, the reaction between the diamine of formula (VI) and the moieties deriving from maleic anhydride bonded to the polymeric matrix, yields amido/aminic and/or imido/aminic groups having the following structures:

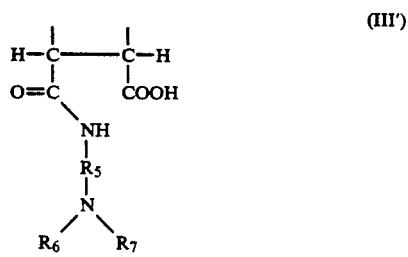

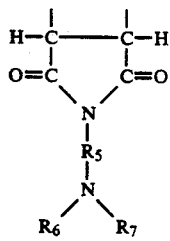

(IV')

in which R₅, R₆ and R₇ have the same meanings as reported hereinabove.

The amide- and/or imide-forming reaction can be performed on the elastomer, both in solution and in the molten state.

As regards the solution reaction, the elastomeric copolymer functionalized with the unsaturated anhydride, dissolved in a suitable solvent, is reacted with the diamine of formula (VI), at a temperature generally comprised within the range of from 80° to 170° C. As solvents, in general xylene, toluene, benzene, trichloroethane, and so forth, can be used. After the reaction, the copolymer is recovered by precipitation in a non-solvent, and subsequent filtration. An alternative method for recovering the reaction product consists in suspending the solution in an aqueous carrier, subsequently azeotropically distilling off the organic solvent, and finally coagulating the polymer. When the reaction temperature is higher than solvent and/or amine boiling points, the reaction can be carried out inside a sealed reactor, under an increased pressure.

The reaction between the copolymer functionalized with the unsaturated anhydride, and the diamine of formula (VI), is preferably carried out in the molten state. In this case, high-boiling diamines (i.e., with boiling points generally higher than 180°-200° C.) should be used. The reaction with the copolymer in the molten state can be carried out either during the extrusion step, by directly adding the diamine to the molten polymer, or in a batch mixer (of Banbury type). The reaction conditions generally provide for reaction temperatures comprised within the range of from 150° to 250° C., and reaction times ranging from 1 to 30 minutes.

The components of the thermoplastic composition according to the present invention can be mixed with each other according to any methods known in the art. According to a preferred form of practical embodiment, such a mixing is accomplished by extruding all components, in the molten state, and in one single step.

As already mentioned hereinabove, the thermoplastic compositions according to the present invention display a considerable increase in impact strength and in tenacity, as compared to compositions of the same type as known from the prior art, and therefore can be used in all those industrial fields in which, beside the typical mechanical properties of thermoplastic polyethers, such as high modulus and tensile strength values, very good characteristics of impact strength are required. Such properties are required, e.g., in the production of semistructural parts for the sector of transportation, such as bumpers, side panels, doors, and so forth.

Some examples of practical embodiment of the present invention are reported now for merely illustrative purposes, and in no way shall such examples be construed as being limitative of the scope of the same invention.

EXAMPLE 1

A solution containing 4% by weight of an ethylene-ethyl acrylate-maleic anhydride copolymer (in the mutual molar ratio of 71:28:1) in xylene is heated at reflux temperature, for one hour, in a double-jacket reaction vessel equipped with a mechanical stirrer, a reflux condenser of Dean-Stark type and nitrogen inlet device. Thereafter, a large excess of N,N-dimethyl-trimethylenediamine is added dropwise, as an 0.126M solution in xylene. The resulting reaction mixture is kept heated at reflux temperature until water is totally disappeared (reaction time: 8 hours). In that way, the reactive groups deriving from maleic acid anhydride are converted to a practically quantative extent into amido-/aminic and imido/aminic groups corresponding to formulas (III') and (IV').

After cooling, the contents of the reaction vessel are discharged, are reduced to ⅓ of their volume by evaporation in Rotavapor ®, and are poured in an excess of methanol (ratio of xylene:methanol: 1:10 by volume), in order to cause the modified rubber to precipitate. The latter is then recovered by filtration on a glass frit filter. The filter cake is washed with several portions of pure methanol and is dried under vacuum.

EXAMPLE 2

The procedure of Example 1 was repeated, with the polymer recovery method being modified in order to obtain a homogeneous material with suitable particle size.

After being removed from the double-jacket reaction vessel, the xylene solution of the same ethylene/ethyl acrylate/maleic anhydride polymer modified by imidization as disclosed in Example 1 was added by means of dripping funnel, with strong stirring, to an aqueous solution containing 0.15% by weight of methyl-hydroxyalkylcellulose. A suspension of the copolymer was thus obtained, from which the organic solvent was removed by azeotropic distillation (volume ratio of aqueous:organic phases=60:40). The polymer was coagulated by cooling from the organic phase, and was recovered as a fine powder, by filtration on a glass frit filter.

EXAMPLES 3-4

By operating according to the same modalities as disclosed in Example 1, the same ethylene/ethyl acrylate/maleic anhydride elastomer used in Example 1 is modified via imide-forming reaction, by using the following high-boiling diamines:

TABLE I

| Example | Diamine | Concentration (mol/l) | B.P.[1] (°C.) |
|---|---|---|---|
| 3 | 4,4-diaminodicyclohexylmethane | 0.076 | 127-8 |
| 4 | N,N-dimethylethylenediamine | 0.137 | 104-6 |

[1]B.P. = Boiling temperature

EXAMPLE 5 (Comparison Example)

A thermoplastic composition constituted by 70% by weight of PET (with an intrinsic viscosity of 0.74 dl/g, as measured in chlorophenol at 25° C.) and 30% by weight of an ethylene/ethyl acrylate/glycidyl methacrylate (molar ratio 83:14:3) elastomer was obtained by mixing the above said components in a Brabender mixer, at the temperature of 270° C. The mixing test was carried out for 4 minutes, at the revolution speed of 80 rpm.

The resulting mixture was pelletized and compression-moulded under the following moulding conditions:
pressure = 3.16 ton;
temperature = 268° C.;
moulding time = 5 minutes (measured from the time at which the setpoint temperature was reached).

The data relevant to the mechanical properties of the resulting material are reported in Table III.

EXAMPLES 6-9

By means of methodologies and conditions similar to those as disclosed in Example 5, polymeric blends were prepared, which had the following compositions:

TABLE II

| Example | PET (% by weight) | A (% by weight) | B (% by weight) | C (% by weight) | D (% by weight) |
|---|---|---|---|---|---|
| 6 | 70 | 27 | 3 | — | — |
| 7 | 70 | 27 | — | 3 | — |
| 8 | 70 | 27 | — | — | 3 |
| 9 | 70 | 28,5 | — | — | 1,5 | in which:
A = epoxy group-containing elastomer of Example 5;
B, C, D = amido/aminic and/or amino/aminic groups-containing elastomers of Examples 1, 3 and 4 respectively.

The data relevant to the mechanical properties of the resulting materials are reported in Table III.

TABLE III

| Example | Izod impact strength[1] (J/m) | Bending modulus[2] (Mpa) | Yielding stress[3] (MPa) |
|---|---|---|---|
| 5 | 236 | 1331 | 18 |
| 6 | 555 | 1366 | 13 |
| 7 | 238 | 1308 | 17 |
| 8 | 363 | 1407 | 19 |
| 9 | 599 | 1361 | 18 |

[1]ASTM D-256
[2]ASTM D-790
[3]ASTM D-638

We claim:

1. Thermoplastic compositions comprising:
   (a) from 55 to 85% by weight of at least one aromatic polyester;
   (b) from 10 to 40% by weight of at least one elastomeric copolymer constituted by 45-90 mol % of ethylene; 5-50 mol % of an alkyl acrylate or alkyl methacrylate, in which the alkyl moiety contains from 1 to 8 carbon atoms; and 0.3-5 mol % of an unsaturated epoxide;
   (c) from 0.5 to 5% by weight of at least one elastomeric copolymer constituted by 45-90 % of ethylene; 5-50 mol % of an alkyl acrylate or alkyl methacrylate, in which the alkyl moiety contains from 1 to 8 carbon atoms; and 0.1-5 mol % of monomeric units functionalized with amido-aminic and/or imido-aminic groups;
with the total of the percentages of components (a), (b) and (c) equating 100.

2. Thermoplastic compositions according to claim 1, in which the aromatic polyester is poly-(ethylene terephthalate).

3. Thermoplastic compositions according to claim 2, in which said poly-(ethylene terephthalate) has an intrinsic viscosity comprised within the range of from 0.6 to 0.8 dl/g as measured at 25° C. in chlorophenol.

4. Thermoplastic compositions according to claim 1, in which the aromatic polyester is poly-(butylene terephthalate).

5. Thermoplastic compositions according to any, one of the preceding claims, in which said component (b) is constituted by 70-85 mol % of ethylene; 10-25 mol % of an alkyl acrylate or alkyl methacrylate in which the alkyl moiety contains from 1 to 8 carbon atoms; and 2-5 mol % of an unsaturated epoxide.

6. Thermoplastic compositions according to claim 5, in which component (b) the unsaturated epoxide is glycidyl methacrylate or glycidyl acrylate.

7. Thermoplastic compositions according to claim 1, in which said component (c) is constituted by 70-85 mol % of ethylene; 10-28 mol % of an alkyl acrylate or alkyl methacrylate in which the alkyl moiety contains from 1 to 8 carbon atoms; and 0.5-2 mol % of monomeric units functionalized with amino-aminic and/or imido-aminic groups.

8. Thermoplastic compositions according to claim 1, in which the monomeric units functionalized with amido-aminic and/or imido-aminic groups contained in said component (c) are selected from:

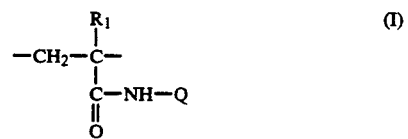

(I)

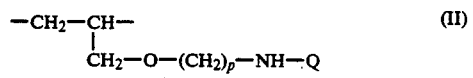

(II)

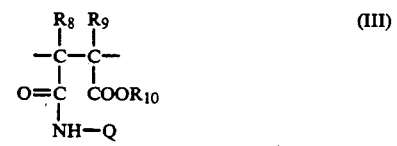

(III)

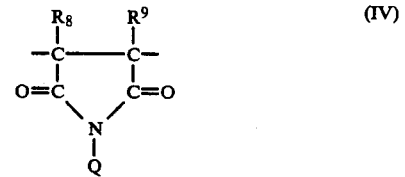

(IV)

in which:
$R_1$, $R_8$ and $R_9$, which may be either equal to, or different from, one another, are —H or —$CH_3$;
p is an integer comprised within the range of from 1 to 6;
Q is a functional group having the structure:

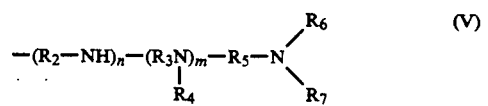

(V)

wherein:
$R_2$, $R_3$ and $R_5$, which may be either equal to, or different from, one another, are $C_1$-$C_{20}$ alkylene groups, or $C_6$-$C_{30}$ arylene groups;

$R_4$, $R_6$, $R_7$ and $R_{10}$, which may be either equal to, or different from, one another, are H or $C_1$-$C_6$ alkyl groups;

n and m, which may be either equal to, or different from, each other, are zero or integers comprised within the range of from 1 to 5.

9. Thermoplastic compositions according to claim 8, in which the monomeric units functionalized with amido-aminic and/or imido-aminic groups contained in said component (c) are selected from:

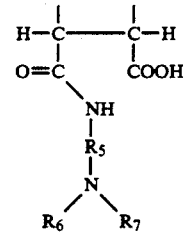

(III')

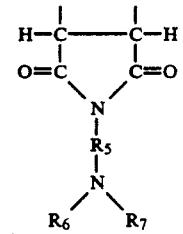

(IV')

in which $R_5$, $R_6$ and $R_7$ have the same meanings as reported in claim 8.

10. Thermoplastic compositions according to claim 1, in which the alkyl radical of the alkyl acrylate or methacryl acrylate contained in components (b) and (c) is of from 1 to 4 carbon atoms.

11. Articles of manufacture obtained from the thermoplastic compositions according to claim 1.

* * * * *